(12) United States Patent
Matsushima

(10) Patent No.: US 10,216,378 B2
(45) Date of Patent: Feb. 26, 2019

(54) MACHINE CONTROL SYSTEM DISPLAYING OPERATION INFORMATION OF MACHINE ON DISPLAY DEVICE CORRESPONDING TO OPERATOR

(71) Applicant: FANUC CORPORATION, Minamitsuru-gun, Yamanashi (JP)

(72) Inventor: Tomonori Matsushima, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 216 days.

(21) Appl. No.: 15/254,085

(22) Filed: Sep. 1, 2016

(65) Prior Publication Data

US 2017/0068411 A1   Mar. 9, 2017

(30) Foreign Application Priority Data

Sep. 3, 2015   (JP) .................................. 2015-173666

(51) Int. Cl.
| | | |
|---|---|---|
| *G06F 3/0484* | (2013.01) | |
| *G05B 19/042* | (2006.01) | |
| *G05B 15/02* | (2006.01) | |
| *G06F 21/31* | (2013.01) | |

(52) U.S. Cl.
CPC ........... *G06F 3/0484* (2013.01); *G05B 15/02* (2013.01); *G05B 19/042* (2013.01); *G06F 21/31* (2013.01); *G05B 2219/24168* (2013.01); *G06F 2221/2101* (2013.01); *G06F 2221/2153* (2013.01)

(58) Field of Classification Search
CPC ....... G06F 3/0484; G06F 21/31; G05B 15/02; G05B 19/042; G05B 2219/24168

USPC .......................................................... 700/83
See application file for complete search history.

(56) References Cited

U.S. PATENT DOCUMENTS

| | | |
|---|---|---|
| 9,501,208 B2 | 11/2016 | Jundt et al. |
| 2004/0172147 A1 | 9/2004 | Dillon |
| 2007/0213872 A1 | 9/2007 | Matsuzaki et al. |

(Continued)

FOREIGN PATENT DOCUMENTS

| | | |
|---|---|---|
| JP | 2004-243472 A | 9/2004 |
| JP | 2006519446 A | 8/2006 |
| JP | 2012116195 A | 6/2012 |

(Continued)

OTHER PUBLICATIONS

Notification of Reasons for Refusal for Japanese Application No. 2015-173666, dated Sep. 11, 2017, including English translation, 6 pages.

*Primary Examiner* — Robert E Fennema
*Assistant Examiner* — Jigneshkumar C Patel
(74) *Attorney, Agent, or Firm* — RatnerPrestia

(57) ABSTRACT

A machine control system includes a display device to display operation information to operate a machine, an external storage device which stores personal information to identify an operator and a screen of the operation information displayed by the operator on the display device in association with each other, and an authentication unit to authenticate the operator based on the personal information stored in the external storage device. A controller reads out, from the external storage device, the operation information screen displayed on the display device by the operator authenticated by the authentication unit, and displays the same on the display device.

3 Claims, 6 Drawing Sheets

(56) References Cited

U.S. PATENT DOCUMENTS

2011/0188076 A1* 8/2011 Maeda ................... G06F 15/00
358/1.15
2012/0116547 A1* 5/2012 Shigehara .......... G05B 19/0428
700/83

FOREIGN PATENT DOCUMENTS

| JP | 2013045949 A | 3/2013 |
| JP | 2016505909 A | 2/2016 |
| WO | WO 2005/099971 A1 | 4/2005 |
| WO | 2014058889 A1 | 4/2014 |

* cited by examiner

MACHINE CONTROL SYSTEM DISPLAYING OPERATION INFORMATION OF MACHINE ON DISPLAY DEVICE CORRESPONDING TO OPERATOR

BACKGROUND OF INVENTION

1. Field of Invention

The present invention relates to a machine control system comprising a controller that controls a machine such as an industrial robot or an NC machine tool, and a display device which displays the operation information of the machine.

2. Related Art

In a machine control system comprising a machine such as an industrial robot or an NC machine tool and a controller that controls the machine, a display device which can display various types of operation information necessary for an operator to operate the machine or the controller, for example, a teaching operation panel, is provided. The display device is used when the operator teaches the machine an operation. Namely, the operator actually operates the machine using the display device, and the operation of the machine at that time is stored on the controller. Accordingly, the display device is provided with an input unit to input data necessary to operate the machine with respect to each piece of operation information. Such a display device may use, for example, a touch panel liquid crystal display (LCD).

There are various types of operation information displayed on the display include, for example, a parameter table or a program list allowing the input or change of data necessary for operating the machine or the controller.

Such a display devices first prompts the operator to enter their identification information (ID). Then, if the input identification information is one that has previously been stored in the controller connected to the display device, the controller reads the parameter table or program list, etc., out of the storage area of the controller and displays the same on the display device. Accordingly, only the specific operator assigned with the identification information is able to input or change data using the input unit with respect to the parameter table or program list displayed on the display device.

Various inventions have been proposed which operate a device in response to identification information of an operator. For example WO 2005/099971 discloses an autonomous robot which obtains various types of information, such as identification information of a memory card, information related to an operator, or the history of the operator contacting the robot and acts based on the obtained information.

The invention disclosed in WO2005/099971 has the function of identifying an operator but is not provided with the function of changing the screen displayed on the display device. In contrast thereto, Japanese Patent Application Laid-open No. 2004-243472 discloses a display device capable or identifying an individual operator and switching the display screen in accordance with the qualifications or the physical condition of the operator; and an industrial robot provided therewith.

In a factory, a plurality of machines and a plurality of controllers which control the respective machines may be provided and a display device may be connected to each of the controllers. In such cases, it is desirable that with respect to each of the display devices connected to the respective controller, an appropriate screen corresponding to the operator using the display device is displayed. However, in order for this to be realized, in the invention disclosed in Japanese Patent Application Laid-open No. 2004-243472, the following problem arise.

Namely, in the invention disclosed in Japanese Patent Application Laid-open No. 2004-243472, it is necessary to store operator identification information and an appropriate screen for the operator in association with each other in the storage region of the controller. As a result, for each controller connected to a display device, in order to display the appropriate screen for the operator using the display, the above storage operation must be carried out on each of the controllers, which requires time and effort. In other words, if an operator wants to display the information on a screen stored in a certain controller on a display device connected to a different controller, the operator must carry out the aforementioned storage operation from the start on the different controller.

SUMMARY OF THE INVENTION

The present invention provides a machine control system which displays operation information corresponding to an operator on a display device connected to any controller without carrying out the aforementioned storage operation on each controller.

According to a first aspect of the present invention, there is provided a machine control system comprising at least one machine, at least one controller which controls the at least one machine, a display device which displays operation information for operating the at least one machine or the at least one controller, an external storage device which stores personal information for specifying an operator and an operation information screen displayed on the display device by the operator in association with each other, and an authentication unit to authenticate the operator based on the personal information stored in the external storage device, wherein the at least one controller is adapted to read out the operation information screen displayed on the display device by the operator authenticated by the authentication unit, from the external storage device, and display the same on the display device.

According to a second aspect of the present invention, there is provided the machine control system of the first aspect, wherein the external storage device stores the operation information screen displayed on the display device and the number of times the screen is displayed, for each of the plurality of different pieces of personal information at each operation, and the at least one controller is adapted to read out, from the external storage device, the operation information screen which was most frequently displayed from among the plurality of operation information screens stored for each personal information in the external storage device, and display the same on the display device.

According to a third aspect of the present invention, there is provided the machine control system of the first aspect, wherein the external storage device stores, for each of the plurality of different pieces of personal information, the operation information screen displayed on the display device, and the at least one controller is adapted to read out, for each piece of personal information, the operation information screen displayed on the display device at the end of the operation for each piece of personal information, from the external storage device, and display the same on the display device.

BRIEF DESCRIPTION OF THE DRAWINGS

The objects, features, and advantages and other objects, features and advantages of the present invention will become more apparent from the following detailed description of the exemplary embodiments of the present invention illustrated in the accompanying drawings in which.

DETAILED DESCRIPTION

Figure 1:
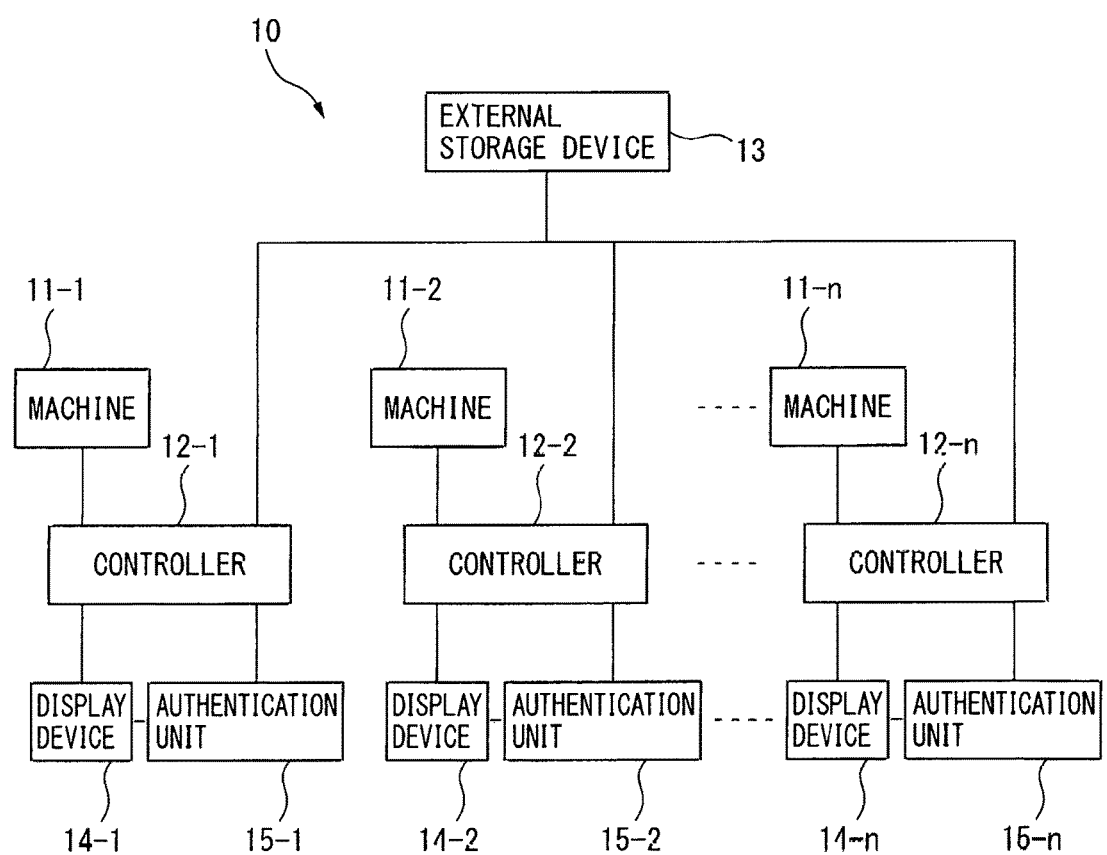
FIG. 1 is a block diagram showing the structural concept of the machine control system according to a first embodiment.

Next, the embodiments of the present invention will be described with reference to the drawings. In the following drawings, the same reference numerals correspond to the same component. Further, constitutional elements in different drawings with the same reference numeral have the same function. Further, to facilitate understanding, the scale of the drawings has appropriately been changed.

FIG. 1 is a block diagram showing the structural concept of the machine control system according to the first embodiment of the present invention.

The machine control system 10 of the present embodiment shown in FIG. 1 comprises n number of machines 11-1 to 11-n such as industrial robots or NC machine tools etc. and n number of controllers 12-1 to 12-n which control the respective machines 11-1 to 11-n (note that n is a natural number).

Further, the machine control system 10 comprises one external storage device 13 connected to the n number of controllers 12-1 to 12-n, n number of display devices 14-1 to 14-n connectable to the respective controllers 12-1 to 12-n, and n number of authentication units 15-1 to 15-n connected to the respective controllers 12-1 to 12-n. Note that the n authentication units 15-1 to 15-n may be connected to the respective display devices 14-1 to 14-n instead of the controllers 12-1 to 12-n.

Note that in FIG. 1, the n machines 11-1 to 11-n and the n controllers 12-1 to 12-n are shown, however, in the present invention it is acceptable to have at least one machine 11-1 to 11-n and at least one controller 12-1 to 12-n.

Further, the authentication units 15-1 to 15-n may be built into the respective controllers 12-1 to 12-n or the respective display devices 14-1 to 14-n.

Furthermore, in FIG. 1, the n displays 14-1 to 14-n are shown, however, the operator may share the use of at least one of the display devices 14-1 to 14-n with the controllers 12-1 to 12-n. It is preferable that a cable or a network such as wireless LAN is used to connect each controller 12-1 to 12-n to the external storage device 13, and each controller 12-1 to 12-n to each display device 14-1 to 14-n.

Each display device 14-1 to 14-n is, for example, a teaching operation panel. When the machine control system 10 begins operating, contents are displayed to prompt the operator using each display device 14-1 to 14-n, to input his or her personal information. Note that the personal information of the operator includes information for confirming the identity of the operator such as operator identification information (ID) or a password as will be described later.

Further, each display device 14-1 to 14-n switches the content to prompt the entry of personal information of the operator as previously described, to various types of operation information required for operating each of the machines 11-1 to 11-n or each of the controllers 12-1 to 12-n. Various types of operation information displayed on each display device can be, for example, a parameter table or a program list allowing input or change of data necessary for operating each of the machines 11-1 to 11-n or each of the controllers 12-1 to 12-n.

Note that the parameter table is a table of control parameters used to control, for example, the position and direction etc. of each operation shaft of the robot or NC machine tool. Further, the program list is a list of operation programs for the robot or machining programs for the NC machine tool.

Further, each of the display devices 14-1 to 14-n of the present embodiment comprises an input part for inputting the above-mentioned data or the personal information of an operator. Thus, for each display device 14-1 to 14-n, it is preferable to use a touch panel type liquid crystal display device. Furthermore, each display device 14-1 to 14-n may comprise operation switches etc., such as a jog button, direction keys, and numerical keys to operate the machines 11-1 to 11-n.

Furthermore, as the external storage device 13, for example, a hard disk attached to a PC, a DVD or a USB memory may be used.

Specifically in the present application, the external storage device 13 stores, for example, the personal information specifying the operator using the display 14-n and the operation information screen displayed on the display device 14-n by the operator in association with each other. Further, in the present application, the operation information screen displayed on the display device 14-n, and the frequency the screen is displayed, are stored in the external storage device every time the operator, for example, operates the machine 11-n or the controller 12-n. Note that the operation information screen includes the aforementioned parameter table or program list itself and the screen on which they are displayed on the display device 14-n.

The same is true not only for the display device 14-n but also each or the display devices 14-1 to 14-n.

Furthermore, each authentication part 15-1 to 15-n has a function of authenticating the operator based on personal information of the operator stored in the external storage device 13. To that end, as previously described, each display device 14-1 to 14-n displays contents which prompt the operator to input the personal information of the operator on starting up the machine control system 10.

Furthermore, after authenticating the operator, each of the display devices 14-1 to 14-n can switch from the contents prompting the input of personal information of the operator to the aforementioned operation information screen.

More specifically, when the personal information of an operator is input into, for example, the display device 14-n, the authentication part 15-n determines whether or not the input personal information is stored in the external storage device 13. Then, if the input personal information is stored in the external storage unit 13, the controller 12-n reads out the screen of the operation information such as a program list or parameter table from the external storage device 13 and displays the same on the display device 14-n. In other words, the controller 12-n displays the operation information screen corresponding to the authenticated operator on the display device 14-n. The above is also true when an operator's personal information is input into the other display devices 14-1, 14-2, etc. Thereafter, the operator who inputs his/her personal information into the display device 14-*n* is able to input or change data of the program list or parameter table corresponding to the operator.

Note that, when the operation information screen corresponding to the inputted personal information is not stored in the external storage device 13, it is preferable for a normal screen to be displayed on the display device 14-*n*. Note that, "normal screen" stated herein is the first screen of operation information such as the program list or the parameter table which has not been changed by the operator.

A detailed description of the process flow of the machine control system 10 follows. Note that in the following description, in order to operate the machine 11-*n* and controller 12-*n*, a representative example in which the machine 11-*n*, the display device 14-*n*, the authentication unit 15-*n* and the external storage device 13 are connected to the controller 12-*n* will be described.

Further, the description will be separated into a case where the display device 14-*n* displays an operation information screen necessary to operate the machine 11-*n*, and a case where the operation information screen displayed on the display device 14-*n* is stored in the external storage device 13.

First, the case where the display device 14-*n* displays an operation information screen will be described. Specifically in the present embodiment, when the operator teaches an operation to the machine 11-*n* using the display device 14-*n*, the operation information screen necessary to operate the machine 11-*n* or the controller 12-*n*, for example, the parameter table, will be displayed on the display device 14-*n* connected to the controller 12-*n*.

Figure 2:
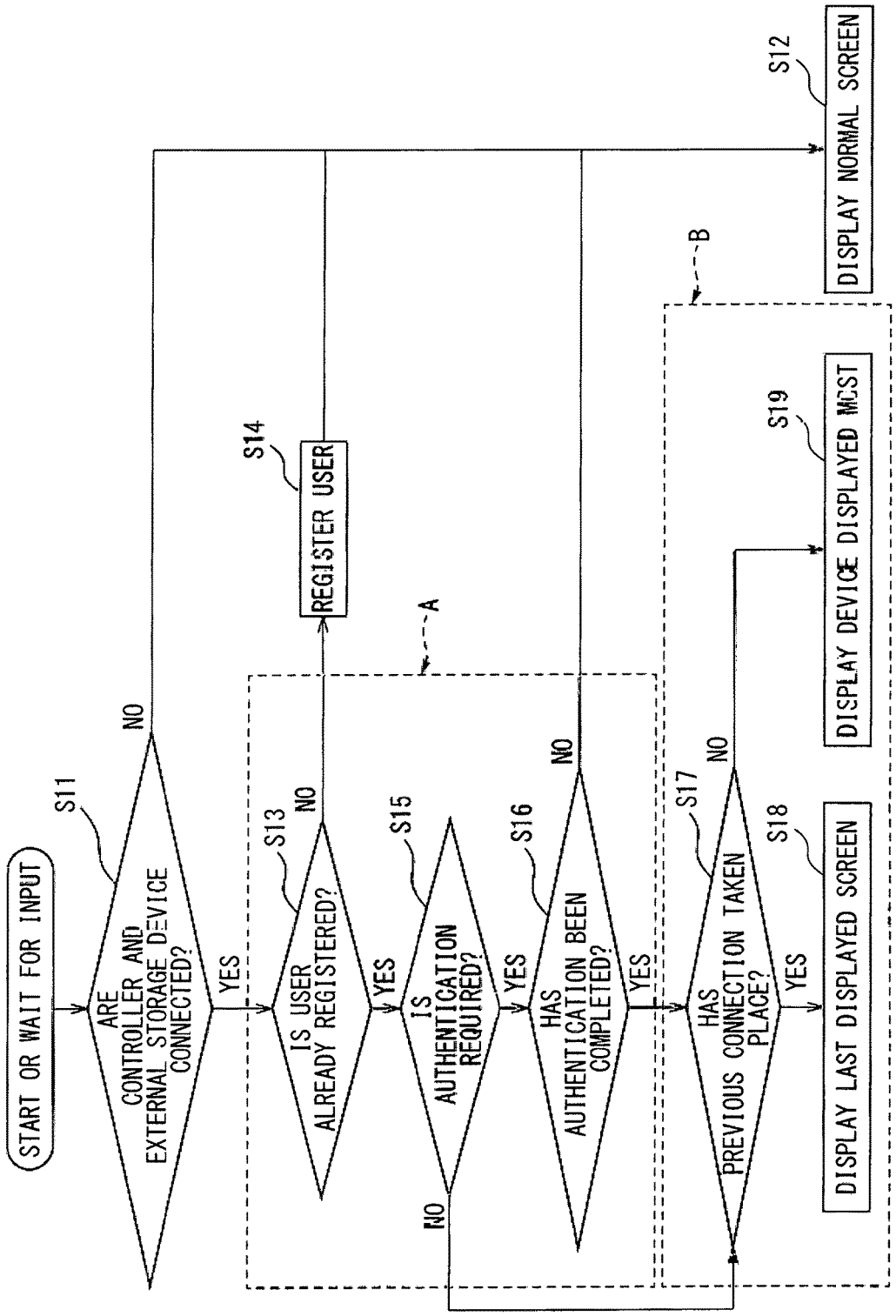
FIG. 2 shows the process flow when a display device of the machine control system shown in FIG. 1 displays a screen of the operation information of the machine.

FIG. 2 is a drawing showing the process flow when the display device 14-*n* of the machine control system 10 displays the aforementioned operation information screen.

With reference to FIG. 2, when the controller 12-*n* is initiated, or when waiting for an input into the display device 14-*n* connected to the controller 12-*n*, it is determined whether or not the controller 12-*n* and the external storage device 13 are connected so as to be able to communicate with each other (FIG. 2 step S11). This is carried out by the controller 12-*n* monitoring the state of the connection between the controller 12-*n* and the external storage device 13.

In the aforementioned step S11, if it is determined that the controller 12-*n* and the external storage device 13 are not connected to each other, the display device 14-*n* connected to the controller 12-*n* displays the above described normal screen (step S12 in FIG. 2). On the other hand, in the aforementioned step S11, if it is determined that the controller 12-*n* and the external storage device 13 are connected to each other, whether the user registration processing has been completed is further confirmed (step S13 of FIG. 2). If the user registration processing has not been completed, the operator operating the display device 14-*n* carries out user registration (step S14 of FIG. 2). Note that, "user registration" refers to the operator storing the operator identification information ID from among the operator's personal information in the external storage device 13 beforehand.

In the aforementioned step S13, if the user registration has been completed, it is determined whether or not the setting requires the authentication of the operator (step S15 of FIG. 2). Note that, in cases where it is desirable for the setting to require operator authentication, operator confirmation information from among the personal information of the operator, for example, a password, is stored in the external storage device 13 when carrying out the aforementioned user registration. On the other hand, it the operator does not store a password in the external storage device 13 upon user registration, the setting of the machine control system 10 of the present embodiment is such that operator authentication is not required. Namely, in step S15 of FIG. 2, each operator can decide at the time of user registration whether operator authentication should be required.

Further, in the aforementioned step S15, if the setting is such that it is not necessary to authenticate the operator, the control is transferred to the processing of step S17 as will be described. Otherwise, in the aforementioned step S15, if the setting is such that it is necessary to authenticate the operator, whether authentication of the operator has been completed is further confirmed (step S16 of FIG. 2). To this end, the controller 12-*n* displays on the display device 14-*n* contents to prompt the operator to input operator confirmation information, for example, a password. Further, when the operator confirmation information is input into the display device 14-*n*, the authentication unit 15-*n* determines whether or not the input operator confirmation information matches the operator confirmation information stored in the external storage device 13.

In the aforementioned step S16, if the operator confirmation information input into the display device 14-*n* is not in the external storage unit 13, the display device 14-*n* connected to the controller 12-*n* displays the aforementioned normal screen (step S12 of FIG. 2). On the other hand, in the above step S16, if the operator confirmation information input into the display device 14-*n* exists in the external storage unit 13, it is determined whether or not the controller 12-*n* has previously been connected to the external storage device 13 (step S17 of FIG. 2).

Next, if the controller 12-*n* has previously been connected to the external storage device 13, the controller 12-*n* displays the operation information screen last displayed on the display device 14-*n* (step S18 of FIG. 2). The screen displayed in step S18 is, for example, the final screen when numerical data of the parameter table displayed on the display device 14-*n* was input or changed by the operator. Otherwise, in the aforementioned step S17, if the controller 12-*n* has not been previously connected to the external storage device 13, the controller 12-*n* displays the most frequently displayed operation information screen from among the operation information screens displayed on the n number of display devices 14-1 to 14-*n*, on the display device 14-*n* (step S19 of FIG. 2). The screen displayed in step S19, for example, is the operation information screen most frequently used by the operator from among the operation information screens, when various operation information other than a parameter table of a program list is prepared.

Next, a case in which the operation information screen displayed on the display device 14-*n* is stored in the external storage device 13 will be explained.

Figure 3:
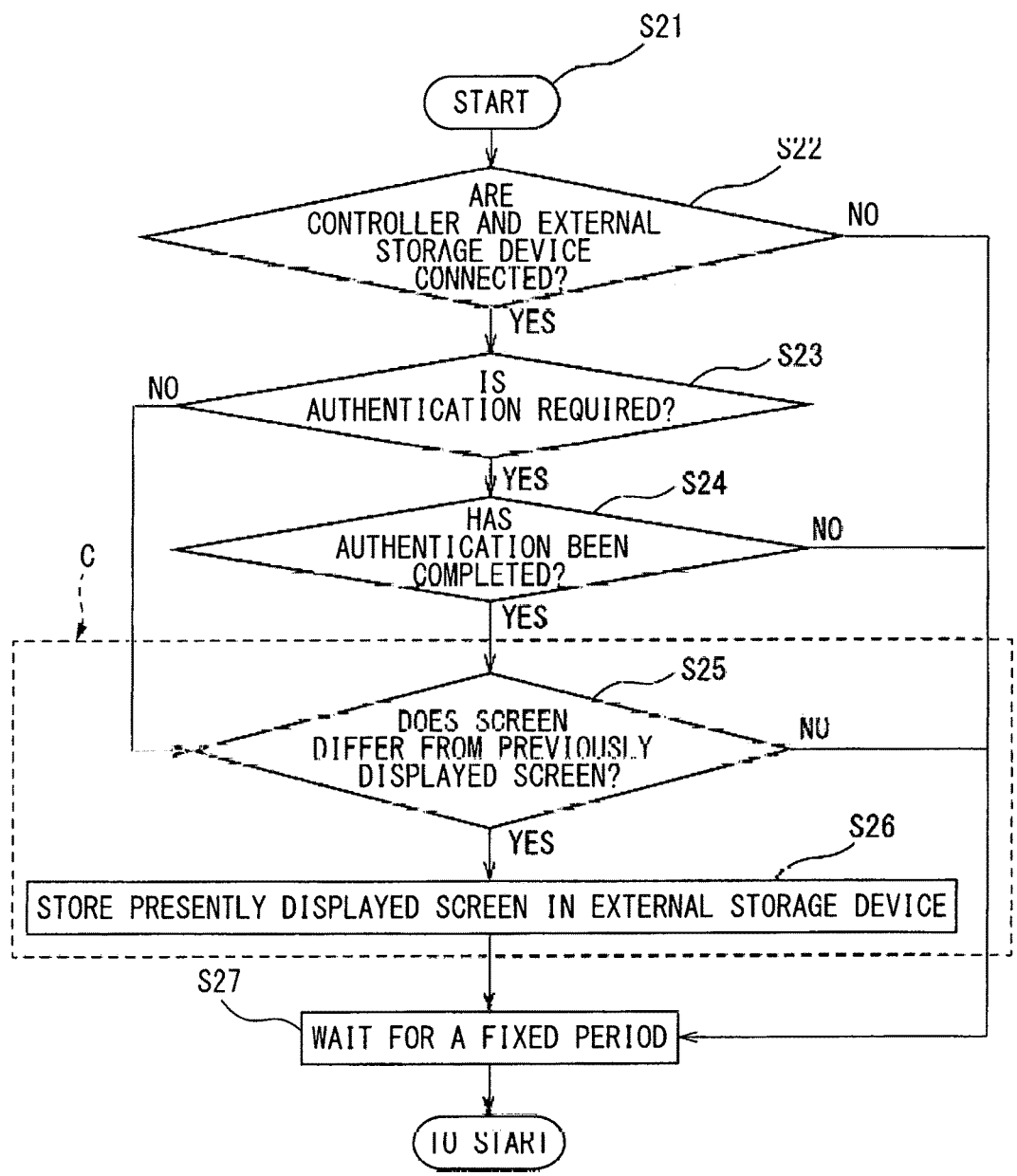
FIG. 3 shows the process flow when the screen of the operation information displayed on a display device of the machine shown in FIG. 1 is stored.

FIG. 3 is a drawing illustrating the processing flow when storing the operation information screen displayed on the display device 14-*n*.

When initiating the storage of the operation information screen displayed on the display device 14-*n* in the external storage device 13 (FIG. 3 step S21), it is determined whether or not the controller 12-*n* is connected to the external storage device 13 so that they are capable of communicating with each other (FIG. 3 step 22). This is determined by the controller 12-*n* monitoring the connection state between the controller 12-*n* and the external storage device 13.

In the aforementioned step S22, if it is determined that the controller 12-*n* and the external storage device 13 are not connected to each other, the controller 12-*n* waits for a predetermined period of time (FIG. 3 step S27). Further, the control again returns to the aforementioned step S21. Namely the next step S23 is not carried out until the controller 12-*n* connects to the external storage device 13.

In the aforementioned step S22, if it is determined that the controller 12-*n* and external storage device 13 are connected to each other, it is further determined whether the setting requires the authentication of the operator (step S23 of FIG. 3). In the case the setting does not require authentication of the operator the command is transferred to step S25 which will be described below.

Further, in the above step S23, if the setting requires the authentication of the operator, it is confirmed whether or not authentication of the operator has been completed (FIG. 3, step S24). To this end, the controller 12-*n* displays on the display device 14-*n*, contents prompting the operator to input operator confirmation information from among the personal information of the operator, for example, a password. Further, when the operator confirmation information is input into the display device 14-*n*, the authentication device 15-*n* determines whether or not the input operator confirmation information matches the operator confirmation information stored in the external storage device 13.

In the above step S24, if the operator confirmation information input into the display 14-*n* is not in the external storage device 13, it is determined that the operator cannot be authenticated and the controller 12-*n* is put on stand-by for a fixed period of time (step S27 of FIG. 3). Then, the command is returned to step S21. On the other hand, in the aforementioned step S24, if the operator confirmation information input into the display 14-*n* exists in the external storage device 13, it is determined that authentication of the operator has been performed. Further, it is determined whether or not the operation information screen displayed on display device 14-*n* differs from the operation information screen previously displayed thereon (step S25 of FIG. 3). At this time, it the operation information screen displayed does not differ from what was previously displayed, the controller 12-*n* is put on stand-by for a fixed period of time (step S27 of FIG. 3). Then, the command is returned to step S21.

On the other hand, in the aforementioned step S25, if it is determined that the operation information screen displayed on the display device 14-*n* differs from what was previously displayed thereon, the controller 12-*n* stores the operation information screen currently displayed on the display device 14-*n*, in the storage device 13 (step S26 of FIG. 3). Thereafter, the controller 12-*n* is put on stand-by for a fixed period of time (step S27 of FIG. 3). Then, the command is returned to step S21.

EXAMPLES

Figure 4:
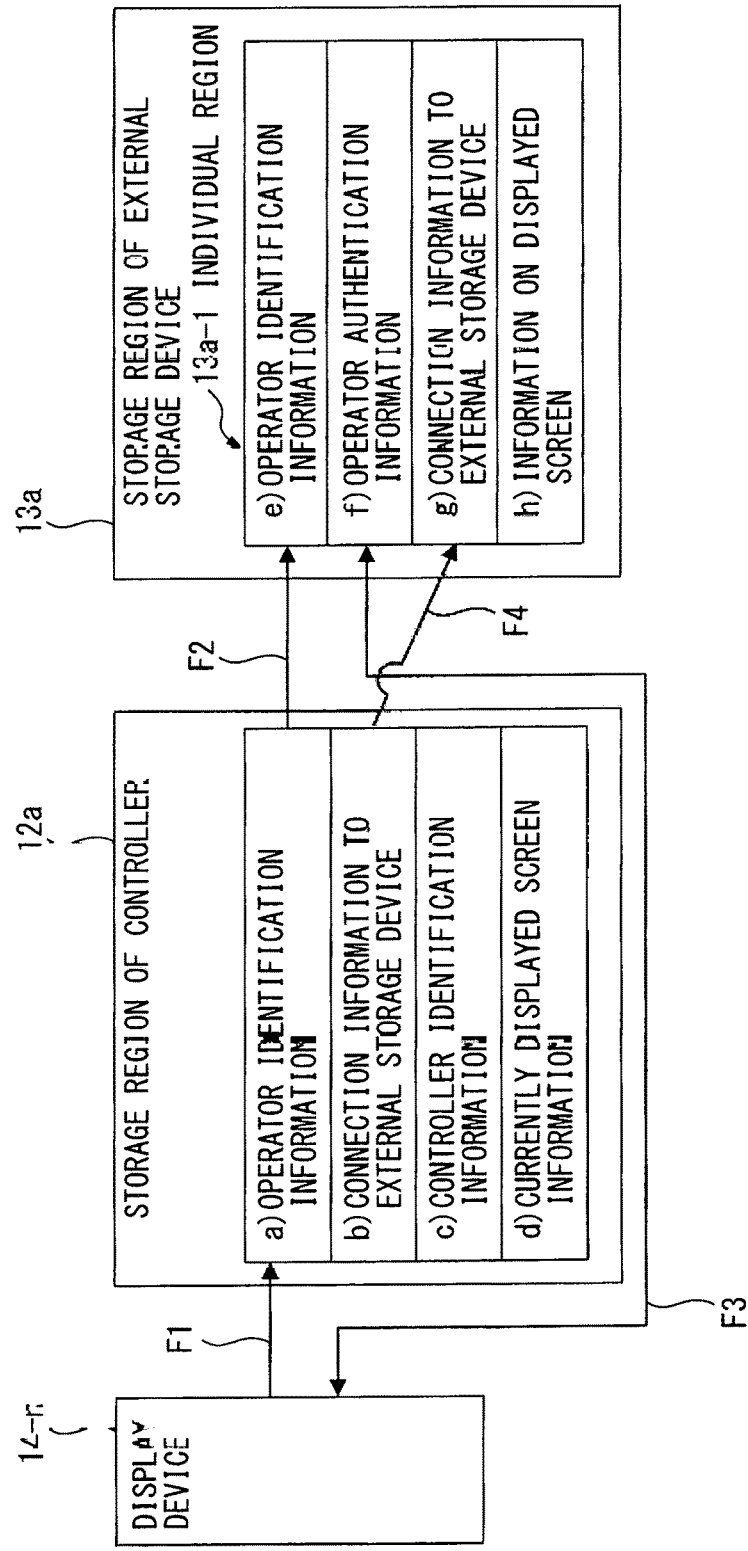
FIG. 4 is a conceptual view illustrating a specific example of process A shown in FIG. 2.

Next, a specific example of the process A enclosed by the dotted line in FIG. 2 will be described. Herein, specific operations carried out particularly in steps S13 and S16 of process A will be described. FIG. 4 is a drawing which conceptually illustrates a specific example of process A illustrated in FIG. 2.

As illustrated in FIG. 4, in the storage region 12*a* of the controller 12-*n* are stored the contents of the items a) operator identifying information, b) information of connection to the external storage device, c) controller identifying information, d) information of the screen being displayed. In the present example, operator identification information input into the display device 14-*n* is stored in item a). Information on the date and time the external storage device 13 and the controller 12-*n* were connected to each other is stored in item b). Information distinguishing controller 12-*n* from the other controllers such as 12-1 and 12-2, etc., for example a serial number for controller 12-*n* is stored in item c). The operation information screen currently displayed on the display device 14 *n* is stored in item d).

Further, in the storage region of the external storage device 13, a plurality of individual regions (not shown) are created corresponding to the respective operator identification information. Of the plurality of individual regions, for example, individual region 13*a*-1 illustrated in FIG. 4, the contents of the items e) identification information of the operator, f) operator confirmation information, g) information of connection to the external storage device, h) information on the displayed screen, are stored. Specifically, operator identification information is stored in item e) at the time of the aforementioned user registration. Operator confirmation information, for example, a password, is stored in item f) at the time of the aforementioned user registration. Further, information on the date and time the external storage device 13 and the controller 12-*n* were connected to each other is stored in item g). Furthermore, operation information screens historically displayed on the n display devices 14-1 to 14-*n* are stored in item h).

First, when the machine control system 10 is started-up, the controller 12-*n* displays contents on the display device 14-*n* which prompts the operator to input operator identification information (ID). Once the operator inputs operator identification information, the input operator identification information is stored specifically in the region of item a) in the storage region 12*a* of the controller 12-*n*, as illustrated by the arrow F1 in FIG. 4. Note that, when power is supplied to the controller 12-*n*, information previously input on the respective regions of items a) and b) is initialized.

Next, as shown by the arrow F2 in FIG. 4, the controller 12-*n* searches the individual region 13*a*-1 in which is stored the operator identification information which matches the operator identification information stored in item a) in the storage region 12*a*, from the storage region 13*a* of the external storage region 13. Namely, it is determined whether or not user registration processing has finished (corresponding to step S13 of FIG. 2). Note that, in FIG. 4, searching is mainly conducted by the controller 12-*n*, however, in the present invention the authentication part 15-*n* (refer to FIG. 1) may be configured to carry out the aforementioned search.

If the operator authentication information is stored in the item f) region in the individual region 13*a*-1 of the storage region 13*a* of the external storage device 13, the controller 12-*n* displays on the display device 14-*n*, contents prompting the operator to input operator authentication information, for example, a password.

Furthermore, once the operator authentication information is input into display device 14-*n* by the operator, as indicated by arrow F3 in FIG. 4, it is determined whether or not the input authentication information and the operator authentication information of item f) of the individual region 13*a*-1 of the storage region 13*a* of the external storage device 13 match (corresponding to step S16 of FIG. 2). If they do not match, the authentication unit 15-*n* (refer to FIG. 1) determines that the authentication of the operator has failed.

On the other hand, if the input authentication information and the operator authentication information of the external storage device 13 match, the authentication unit 15-*n* (refer to FIG. 1) determines that the operator has been authenticated. Along with thio, the controller 12-*n* otorco in item b)

of the storage region 12a, information combining the controller identification information of item c of storage region 12a in combination with the present date and time.

Further, as indicated by the arrow F4 of FIG. 4, the controller 12-n copies information stored in the item b) region in the storage region 12a to the item g) region of the individual region 13a-1 of the storage region 13a of the external storage device 13. The information stored in the item g) region of the individual region 13a-1 is the source of information for confirming the date and time at which the external storage device 13 and the controller 12-n were connected to each other.

Next, the specific operation of the process B enclosed by the dotted line in FIG. 2, namely steps S17, S18 and S19 will be described.

Figure 5:
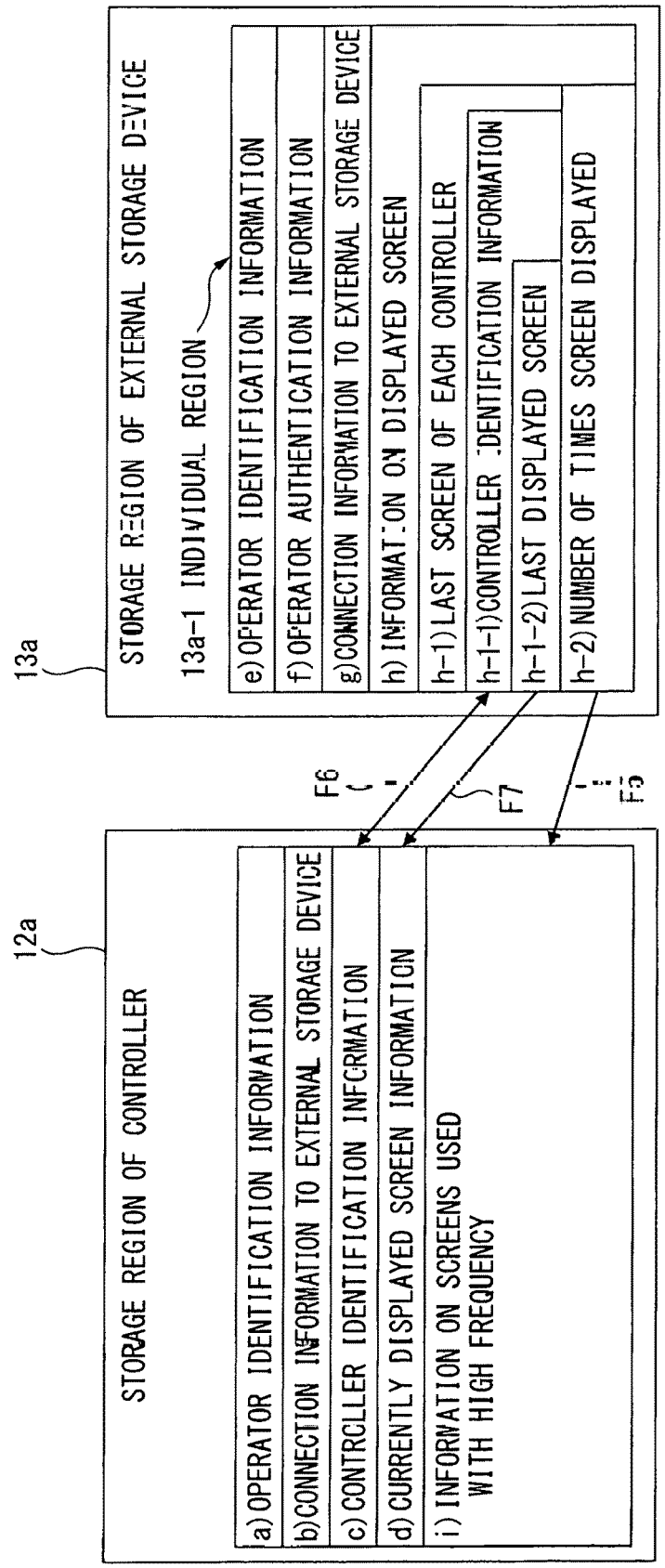
FIG. 5 is a conceptual view illustrating a specific example of process B shown in FIG. 2.

FIG. 5 is a drawing conceptually illustrating an example of the process B shown in FIG. 2. In the process B, in addition to the contents of the items a) to d) illustrated in FIG. 4, item i), the most often used screen information, is also stored in the storage region 12a of the control device 12-n shown in FIG. 5. Specifically, in item i), of the operation information screens which have been displayed on the n display devices 14-1 to 14-n, the operation information screen most frequently displayed is stored.

Further, in the individual region 13a-1 of the storage region 13a of the external storage device 13, the contents of the items h-1) the final screen of each controller, and h-2) the frequency each screen is displayed, are stored as low-order items of the item h) shown in FIG. 4. Specifically, in item h-1) the last displayed operation information screen on each of the display devices 14-1 to 14-n is stored for each of the controllers 12-1 to 12-n. Thus, the contents of the items h-1-1) controller identification information and h-1-2) the last displayed screen, are stored in the individual region 13a-1 as lower-order items of item h-1). To be more specific, identification information of the controller 12-n, for example the serial number, is stored in the item h-1-1). The operation information screen last displayed on the display device 14-n connected to the controller 12-n identified by the controller identification information, is stored in item h-1-2). In other words, in item h-1-2) the operation information screen presently displayed on the display device 14-n by the controller 12-n, overwrites the previous operation information screen last displayed on the display device 14-n (corresponding to step S26 of FIG. 3).

Figure 6:
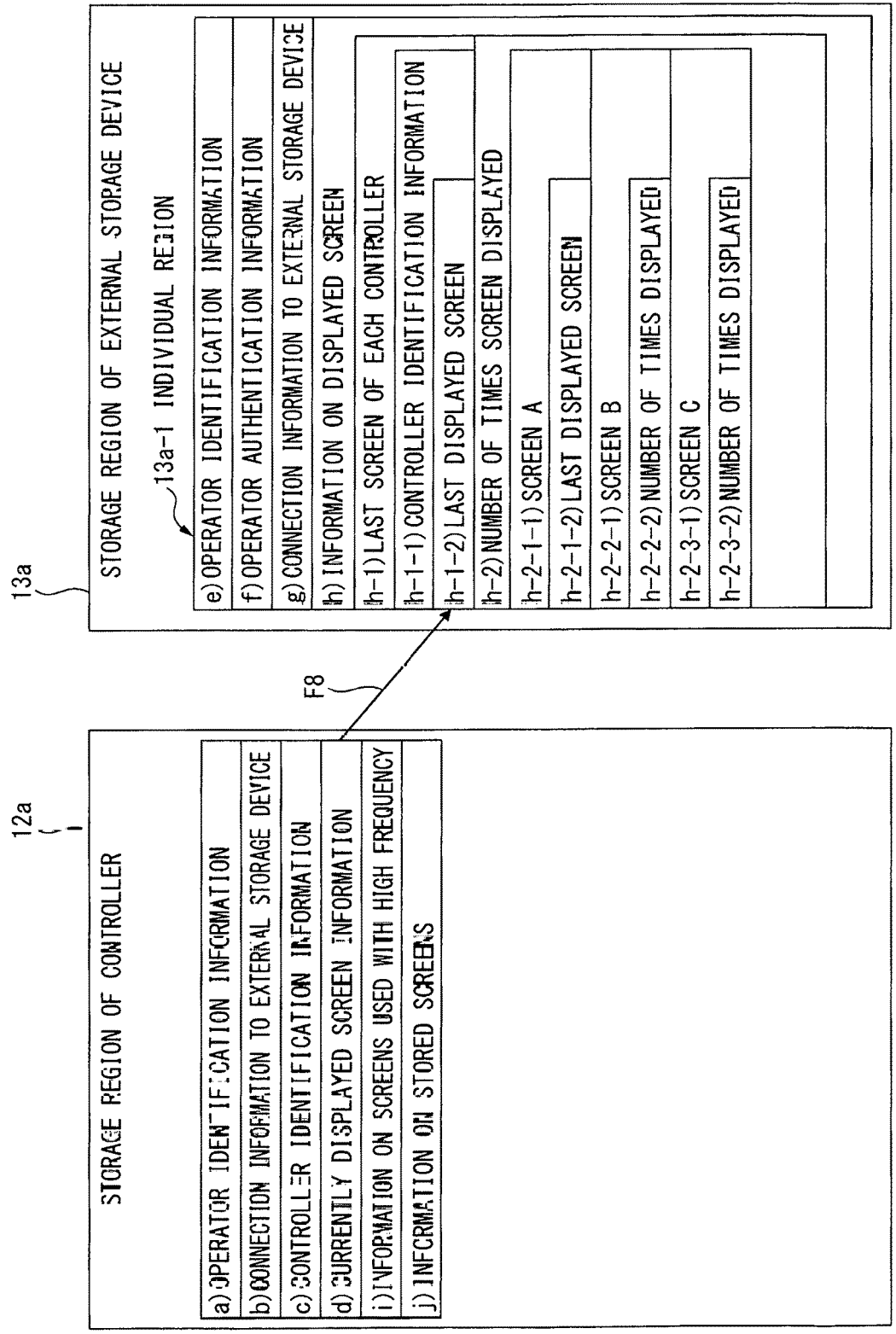
FIG. 6 is a conceptual view illustrating a specific example of process B shown in FIG. 3.

Further, although omitted from FIG. 5, various type of operation information screens displayed on the n display devices 14-1 to 14-n, and the number of times the screen is displayed, are stored in item h-2 (refer to FIG. 6.).

Once authentication of the operator has been completed by process A, shown in FIG. 2, as indicated by the arrow F5 in FIG. 5, the controller 12-n reads the most frequently displayed operation information screen from the region of item h-2) of the storage region 13a of the external storage device 13, and copies the same to the region of item i) in the storage region 12a of the controller 12-n. This will be described later in process C.

Further, as indicated by the arrow F6 in FIG. 5, the controller 12-n, based on the controller identification information in item c) of the storage region 12a, confirms whether or not the controller 12-n and the external storage device 13 were connected previously to each other (corresponding to step S17 of FIG. 2). The controller 12-n refers to the region in item h-1-1) of the storage region 13a of the external storage device 13 for the confirmation. Namely, when the controller 12-n and the external storage device 13 have never been connected, the last operation information screen displayed on the display device 14-n connected to the controller 12-n is not stored in the storage region 13a of the external storage device 13. Therefore, if the controller identification information which identifies the controller 12-n exists in the item h-1-1) of the individual region 13a-1 in the storage region 13a of the external storage device 13, it is determined that the controller 12-n and the external storage device 13 were previously connected. Note that when determining whether or not the controller 12-n and the external storage device were previously connected, information of the date and time at which the external storage device 13 and the controller 12-n were connected to each other, stored in item b) of the storage region 12a of the controller 12-n may be used.

Next, if the controller identification information stored in the controller 12-n exists in the region of item h-1-1) of the individual region 13a-1 in the storage region 13a of the external storage device 13, the controller 12-n performs the following operation. Namely, the operation information screen displayed last on the display device 14-n connected to the controller 12-n is stored in the lower-order item h-1-2) of the item h-1-1) of the individual region 13a-1 of the external storage device 13. Such contents of the last displayed operation information screen on the display device 14-n by the controller 12-n, are copied to the region of item d) in the storage region 12a by the controller 12-n, as shown by the arrow F7 in FIG. 5. Accordingly, if the controller 12-n was previously connected to the external storage device 13, the controller 12-n can display on the display device 14-n the displayed operation information screen last displayed on the display device 14-n (corresponding to step S18 of FIG. 2).

Namely, in the present application, when the external storage device 13 and the display device 14-n were both connected to the controller 12-n which controls the machine 11-n, to teach an operation to the machine 11-n, the operation information screen last displayed on the display 14-n for the teaching can be displayed. Accordingly, if a first operator interrupts a teaching operation on the machine 11-n, then a second operator carries out a teaching operation, and if the first operator restarts the teaching operation thereafter on the machine 11-n, the first operator can use the operation information of the previously interrupted teaching operation.

On the other hand, if the controller identification information stored in the controller 12-n does not exist in the region of item h-1-1) of the individual region 13a-1 in the storage region 13a of the external storage device 13, the controller 12-n performs the following operation. Namely, it the external storage device 13 is connected to the controller 12-n, which controls the machine 11-n, for the first time, the controller 12-n displays the operation information screen in item i) of the storage region 12a on the display device 14-n (corresponding to step S19 of FIG. 2). As shown in FIG. 1, if the n control devices 12-1 to 12-n are each connected to the external storage device 13, of the operation information screens which were displayed on the n display devices 14-1 to 14-n, the operation information screen most frequently displayed is displayed on the display device 14-n.

Further, a specific example of the process C enclosed by the dotted line in FIG. 3, namely the specific operation carried out by steps S25 and S26 will be described.

FIG. 6 is a drawing which conceptually illustrates a specific example of the process C shown in FIG. 3.

In the process C, as illustrated in FIG. 6, in addition to the contents of the items a) to d) and i) shown in FIG. 5, the contents of the item j) stored screen information, is stored in the storage region 12a of the controller 12-n. Specifically, the displayed operation information screens which were stored in the region of item d) before the screen information on display device 14-$n$ changed are sequentially stored in item j).

Further, the following items are stored as lower order items of the item "h-2) number of times the screen is displayed" as shown in FIGS. 5 and 6, in the individual region 13$a$-1 in the storage region 13$a$ of the external storage device 13. Namely, the contents of the items: h-2-1-1) screen A of the operation information; h-2-1-2) number of times screen A is displayed; h-2-2-1) screen B of the operation information; h-2-2-2) number of times screen B is displayed; h-2-3-1) screen C of the operation information; and h-2-3-2) number of times screen C is displayed are stored. That is, item h-2) stores screens of various types of operation information displayed on the n display devices 14-1 to 14-$n$ and the number of times each of the screens is displayed.

Specifically, each time the screen information on the display device 14-$n$ is changed by the operator, the controller 12-$n$ stores the operation information screen displayed on the display device 14-$n$ in the region of item d) in the storage region 12$a$. Namely, the controller 12-$n$ renews the displayed operation information screen stored in the region of the item d) prior to being renewed in the storage region 12$a$. Further, the displayed operation information screen stored in the region of item d) is copied to the region of item j) in the storage region 12$a$. In this way, there are cases when, after the screen information on the display device 14-$n$ has changed, the displayed operation information screen in the region of the item d) in the storage region 12$a$ of the controller 12-$n$, and the screen stored in the region of the item j) in the storage region 12-$a$ of the controller 12-$n$ differ. In such cases, the controller 12-$n$, as indicated by the arrow F8 of FIG. 6, stores the displayed operation information screen in the region of item d) in the storage region 12$a$ in the region of the item h-1-2) of the individual region 13$a$-1 of the storage region 13$a$ of the external storage device 13 (corresponding to step S26 of FIG. 3).

Accordingly, if it is determined that the controller 12-$n$ and the external storage device 13 were previously connected in step S18 of FIG. 2, the controller 12-$n$ can read out the screen last displayed on the display device 14-$n$ from the region of item h-1-2) in the storage region 13$a$ of the external storage device 13 to the region of item d) in the storage region 12$a$ of the controller 12-$n$. With respect hereto, it is as previously stated using FIG. 5 (refer to the arrow F7 of FIG. 5).

Further, if the controller 12-$n$ has not previously been connected to the external storage device 13, the controller 12-$n$ displays the most frequently displayed operation information screen on the display device 14-$n$ (refer to step S19 of FIG. 2). This can be carried out by the following method.

Namely, each time the contents of the screen on the display device 14-$n$ is changed by the operator, the controller 12-$n$ confirms whether or not the displayed operation information screen in the region of item d) in the storage region 12$a$ exists in the region of item h-2) in the individual region 13$a$-1 of the storage region 13$a$ of the external storage device. Namely, the controller 12-$n$ searches for a screen which matches the displayed operation information screen from the item h-2) of the external storage device 13 which has stored the number of times various types of operation information screen have been displayed. As a result, if a matching screen exists, the controller 12-$n$ increases the number of times the screen has been displayed by one. On the other hand, if a matching screen does not exist, the controller 12-$n$ newly adds the displayed operation information screen to the region of the item h-2 in the storage region 13$a$ of the external storage device 13, and sets the number of times the added screen has been displayed to one.

In this way, each time the screen information on the display device 14-$n$ is changed by the operator, the controller 12-$n$ stores the displayed operation information screen and the number of times the screen has been displayed in the region of item h-2 in the individual region 13$a$-1 of the external storage device 13. In other words, the external storage device 13 stores the operation information screen displayed on the display device 14-$n$, and the number of times the screen has been displayed each time the machine 11-$n$ or the controller 12-$n$ is operated. Thus, it the controller 12-$n$ has never been connected to the external storage device 13, the controller 12-$n$ searches for the most frequently displayed operation information screen from the region of the item h-2 in the storage region 13$a$ of the external storage device 13 and is able to display the same on the display device 14-$n$. This point has previously been stated using FIG. 5 (refer to the arrow F5 shown in FIG. 5).

Note that in the above embodiment, the operation information screen displayed on the display device 14-$n$ when teaching an operation to the machine 11-$n$ is stored in the external storage device 13 as an exemplification. However, in the present application, the operation information screen stored in the external storage device 13 is not limited to the operation information screen displayed on the display device 14-$n$ when teaching an operation to the machine 11-$n$. Namely, in the current application, the aforementioned processes A to C are applied to each of the controllers 12-1 to 12-$n$ connected to the external storage device 13. Accordingly, when an operation is taught to each of the machines 11-1 to 11-$n$, shown in FIG. 1, the operation information screens displayed on each of the display device 14-1 to 14-$n$ are stored in the external storage device 13.

As described above, the following effects can be brought about by the machine control system 10 of the present embodiment.

In the present application, the operation information screens displayed on each of the display devices 14-1 to 14-$n$ connected to the respective controllers 12-1 to 12-$n$, shown in FIG. 1, are stored in the external storage device 13 in association with the individual information of the operators using each of the display devices. Accordingly, an operation information screen in the external storage device 13 can be displayed corresponding to the operator for any display device from 14-1 to 14-$n$ connected to any one of the controllers 12-1 to 12-$n$ shown in FIG. 1. For example, when an operator wants to display the operation information screen displayed on the display device 14-$n$ when carrying out an operation with the controller 12-$n$, on the display device 14-1 connected to a different controller 12-1 as well, the operation information screen of the controller 12-$n$ operated by the operator can be read out from the external storage device 13 based on the personal information of the operator.

Specifically, in the present application, among the operation information screens displayed on the display device 14-$n$, when the operator operates the controller 12-$n$ of the machine 11-$n$, the most frequently displayed operation information screen is stored in the external storage device 13. Accordingly, when the operator connects the external storage device 13 to the different controller 12-1 for the first time, the most frequently displayed operation information screen displayed on the display device 14-$n$ by the operator, is read out from the external storage device 13 and can be displayed on the display device 14-1 connected to a different controller 12-1.

Accordingly, even in the case of an operator carrying out a teaching operation for the first time on machine 11-1 by a different controller 12-1, the operator can use the operation information of the most carried out teaching operation on the machine 11-n by the operator, thus teaching operations are simplified.

Thus, the effect brought about by the invention of the present application is that storing the operation information screen determined according to the operator in each of the controllers 12-1 to 12-n as in the prior art, is no longer required.

Furthermore, in the machine control system 10 according to the present embodiment, for example, when the machine 11-n or the controller 12-n is operated, namely, when an operation is being taught to the machine 11-n, the operator using the display device 14-n connected to the controller 12-n is authenticated. Specifically, in the present application, the authentication of the operator is carried out based on personal information such as a password stored beforehand in the external storage device 13. Accordingly, the machine control system 10 of the present embodiment does not require a special authentication device such as fingerprint authentication with respect to the controllers 12-1 to 12-n or the display devices 14-1 to 14-n.

Further, according to the machine control system 10 of the present embodiment, as stated above, when the controller 12-n has previously been connected to the external storage device 13, the operation information screen last displayed on the display device 14-n may be displayed on the display device 14-n.

Accordingly, with respect to the machine 11-n, in the case that a first operator interrupts a teaching operation thereon and a second operator carries out a different teaching operation, thereafter, if the first operator resumes the teaching operation on the machine 11-n, the first operator can use the operation information of the previously interrupted teaching operation.

Above, typical embodiments were used to describe the invention. However, a person skilled in the art, without exceeding the scope of the present invention, would understand that changes to each of the aforementioned embodiments and various other changes, omissions and additions may be carried out. Further, appropriately combining each of the aforementioned embodiments is within the scope of the present invention.

EFFECTS OF THE PRESENT INVENTION

According to the first aspect of the present invention, by storing the operation information screen displayed on the display device on the external storage device when the operator operates the machine or the controller, an operation information screen which exists in the external storage device may be displayed on an arbitrary display device connected to any of the controllers. Thus storing an operation information screen corresponding to an operator on each of the controllers as in the prior art is not required.

According to the second aspect of the present invention, when an operation is taught to the machine, the most frequently displayed operation information screen can be read out from the external storage device and displayed on the display device. Specifically, if the external storage device is connected to a controller which controls a machine for the first time, the operator can use the most frequently used operation information.

According to the third aspect of the present invention, when an operation is taught to the machine, the operation information screen last displayed on the display device can be read out from the external storage device and displayed on the display device. Specifically, if a controller controlling a machine has previously been connected to the external storage device, the operation information screen last displayed at the time of the connection can be displayed. Accordingly, if a first operator interrupts a teaching operation on a machine, then a second operator carries out a teaching operation on the machine, if the first operator resumes the teaching operation on the machine thereafter, the first operator can use the operation information for the teaching operation which was previously interrupted.

The invention claimed is:
1. A machine control system comprising:
at least one machine including an industrial robot or a machine tool;
at least one controller which controls the at least one machine;
a display device which displays operation information for operating the at least one machine or the at least one controller;
an external storage device which stores personal information for specifying an operator and an operation information screen displayed on the display device by the operator in association with each other;
an authentication unit to authenticate the operator based on the personal information stored in the external storage device;
wherein the external storage device stores the operation information screen displayed on the display device at each operation and the number of times the screen is displayed, and the operation information screen displayed on the display device at a last operation, for each of the plurality of different pieces of personal information,
wherein after the authentication unit authenticates the operator, the at least one controller connected to the display device is adapted to:
if the controller has never connected to the external storage device, read out, from the external storage device, the operation information screen which was most frequently displayed from among the plurality of operation information screens stored for each personal information in the external storage device, and display the same on the display device, and
if the controller has previously connected to the external storage device, read out, for each piece of personal information, the operation information screen displayed on the display device at the end of the operation for each piece of personal information, from the external storage device, and display the same on the display device.

2. The machine control system according to claim 1, wherein if the controller identification information which identifies the controller exists in an individual region in a storage region of the external storage device, it is determined that the controller has previously connected to the external storage device.

3. The machine control system according to claim 1, wherein if the controller identification information which identifies the controller does not exist in an individual region in a storage region of the external storage device, it is determined that the controller has never connected to the external storage device.

* * * * *